May 28, 1935.  B. H. SMITH  2,003,016
DEMAND METER
Filed Sept. 13, 1934
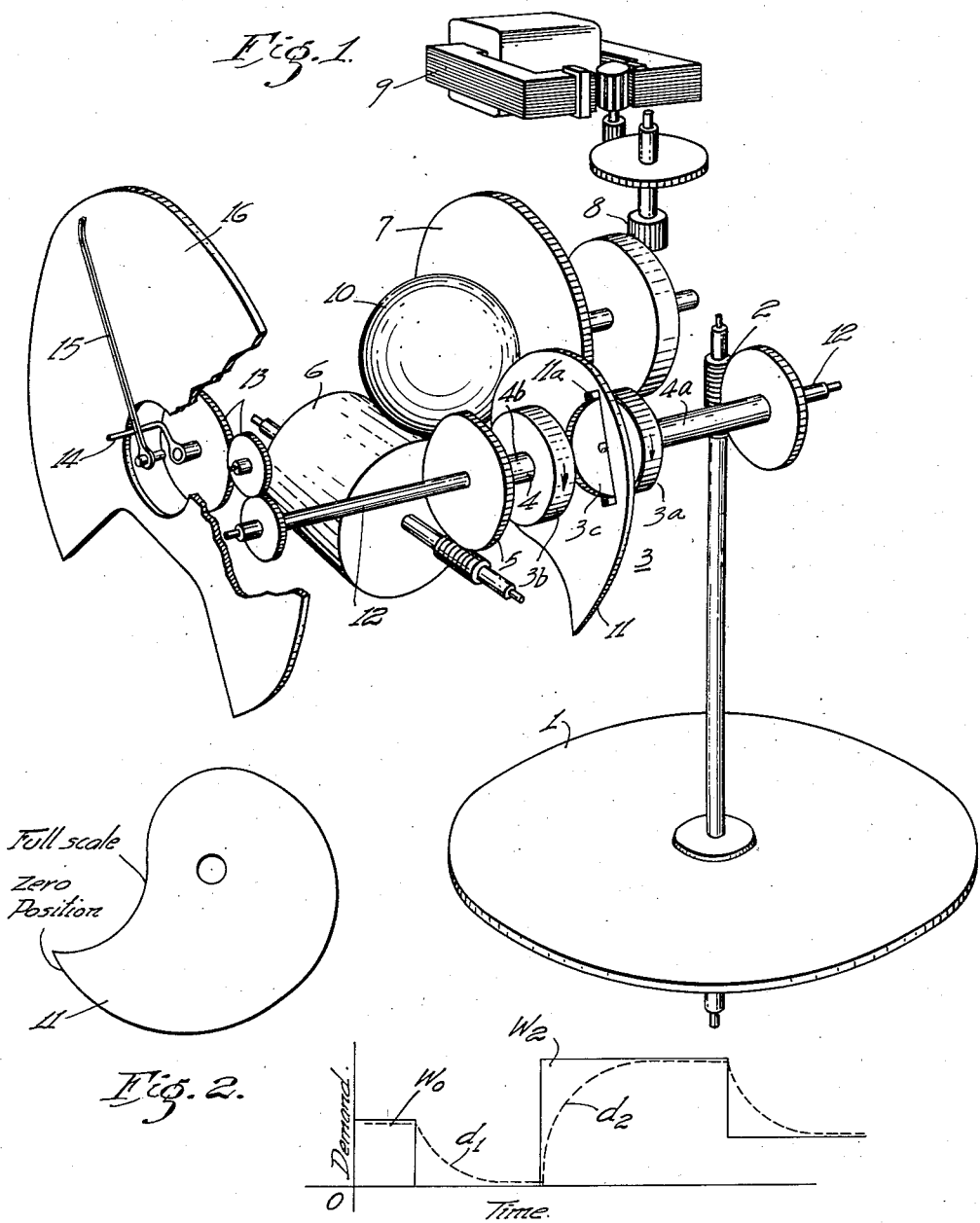
WITNESSES:
INVENTOR
Benjamin H. Smith.
BY
ATTORNEY Patented May 28, 1935

2,003,016

UNITED STATES PATENT OFFICE 2,003,016

DEMAND METER

Benjamin H. Smith, Bloomfield, N. J., assignor to Westinghouse Electric & Manufacturing Company, East Pittsburgh, Pa., a corporation of Pennsylvania Application September 13, 1934, Serial No. 743,860

5 Claims. (Cl. 171—273)

My invention relates to demand meters and particularly to such meters which operate mechanically to produce a lagged demand indication which is an integrated function of the measured variable with respect to time. It has heretofore been proposed to effect the mechanical integrating operation necessary in such a meter by means of a differential gear having one element driven at a speed proportional to the measured variable and a second element driven at a variable speed proportional to the deflection of the third or planetary element of the differential gear. It may be shown that, with such an arrangement, the deflection of the planetary element after a prolonged steady demand of any value is proportional to the value, and in response to a sudden change of demand, the deflection of the planetary element approaches the adjusted value along an exponential curve. For example, if the demand has been $W_0$ for a long period of time and suddenly changes to zero, the deflection of the planetary element during its change from $W_0$ to zero may be represented as $$W = W_0 e^{-at}$$

where
  $W$=the instantaneous reading of the demand meter (deflection of the planetary)
  $W_0$=initial demand
  $e$=the base of natural logarithms
  $a$=a constant
  $t$=time.

Similarly for a sudden increase of demand, the position of the planetary element approaches its adjusted value along the corresponding rising function $(1-e^{-at})$.

The exponential functions $e^{-at}$ and $(1-e^{-at})$ will be recognized as the time characteristics of so-called "single-energy" transients, that is, transients in which the rate of storage or rate of dissipation of a stored quantity is proportional to the stored quantity. These curves are followed exactly by the voltage of a condenser being charged or discharged through a resistor, the inductive discharge current in a circuit containing inductance and resistance, and similar physical phenomena such as the change of weight of radioactive materials. They are also closely approximated by the temperature changes of electrical machinery and by many complicated transients. Such exponential functions are, perhaps, the perfect standard for demand measurements as they most closely represent the strains imposed upon diversified apparatus under prolonged load.

The differential arrangements heretofore proposed, however, have not come into commercial use because of the mechanical difficulties of providing a suitable mechanism. I have found that for proper operation of a demand meter of the type indicated above, it is necessary that the planetary element be rotatable freely without a substantial mechanical load and without any tendency to stick or bind. By permitting free rotation of the planetary element, it becomes impossible for the meter driving element and the timing element to exert torques on each other, and the operation of these elements is accordingly free and accurate.

It is an object of my invention to provide a novel demand meter of the type indicated above, in which a novel variable ratio transmission mechanism shall be provided which shall impose a minimum mechanical burden on the differential gear.

Another object of my invention is to provide a novel demand meter of the exponential type which shall be of simple and rugged construction.

Other objects of my invention will become evident from the following detailed description taken in conjunction with the accompanying drawing, in which Figure 1 is a view in perspective of the principal operating parts of a demand meter embodying my invention, with parts broken away.

Fig. 2 is a diagrammatic view showing the contour of a cam used in the practice of my invention; and, Fig. 3 is a time-demand chart illustrating the operation of my invention.

Referring to Fig. 1, in detail, a primary meter element 1, which may be the movable element of any continuous-motion form of meter, such as a watthour meter, is connected by means of suitable gearing 2 and a sleeve 4a to one driving element 3a of a differential gear 3. The second driving element 3b of the differential gear 3 is mounted on a sleeve 4b and connected by means of suitable gearing 5 to a cylinder 6, to be driven at a speed proportional to that of the latter.

The cylinder 6 is rotatably mounted so as to turn about an axis inclined a few degrees from the horizontal, and parallel to the plane of a timing disc 7. The timing disc 7 is connected by gearing 8 to a suitable constant speed timing device, such as a sub-synchronous timing motor 9 of a construction well-known in the art.

A ball 10, preferably of aluminum, is rested freely on the cylinder 6 in contact with the timing disc 7. The direction of inclination of the cylinder 6 from the horizontal is such that the ball 10 rolls by gravity into contact with a cam 11.

The cam 11 is secured to shaft 12 which passes freely through the sleeves 4a and 4b to suitable mechanism 13 for driving a pusher 14. The pusher 14 cooperates in the usual manner with a maximum pointer 15 and a dial 16. A gear wheel 3c is rotatably secured in a slot 11a in the cam 11, in such manner as to engage the elements 3a and 3b of the differential gear 3. With this construction, the cam 11 forms the planetary element of the differential gear 3.

The relative positions of the cylinder 6 and timing disc 7 are such that when the point of contact of the ball 10 with the cam 11 is at the angular position of the latter corresponding to zero reading of the pointer 15, the ball 10 touches the disc 7 at its exact center. The contour of the cam 11 is such that upon angular movement of the cam from its zero position, the ball 10 is moved away from the center of the timing disc 7 a distance exactly proportional to the angular deflection of the cam 11. The contour of the cam 11 necessary to accomplish this result is approximately an involute curve, as shown in Fig. 2.

The operation of the demand meter shown in Fig. 1 may be set forth as follows: It will be assumed that initially the synchronous motor 9 and meter element 1 are in operation and the pusher 14 is at a maximum position as shown. Under these conditions, the elements 3a and 3b are being driven at substantially equal speeds in the same direction as indicated by arrows.

If the demand suddenly falls to zero, the meter element 1 and the part 3a of the differential gear cease to rotate. However, the element 3b continues to be driven, in the direction indicated by the arrow, by means of the cylinder 6 and ball 10 from the synchronous motor 9. The rotation of element 3b drives the cam 11 at half the speed of element 3b toward the zero position of pusher 14. However, as the cam 11 rotates toward its zero position, the point of contact of the ball 10 with the timing disc 7 approaches the center of the latter, and the speed of cylinder 6 and element 3b fall proportionately.

The cam 11 and pusher 14 accordingly approach their zero positions at a gradually decreasing rate. As the rate of change of deflection of the cam 11, i. e., its speed, is proportional to its deflection, it may be shown that its deflection follows the exponential law mentioned above.

Referring to Fig. 3, in which the abscissae denote time and ordinates denote demand, the exponential curve of deflection of the pusher 14 following a decrease of demand to zero is indicated by the dotted curve section $d_1$. If the zero demand condition persists for a sufficiently long time, the pusher deflection becomes zero. Upon increase of the demand to another value such as $W_2$, the pusher deflection approaches the new value along a rising exponential curve section $d_2$.

The operation of the meter corresponding to the curve section $d_2$ may be explained as follows: When the cam 11 finally reaches its zero position, the ball 10 touches the timing disc 7 at its exact center so that the cylinder 6 and element 3b of the differential gear 3 come to rest. Both elements 3a and 3b of the differential gear 3 are accordingly at rest.

If the meter element 1 starts to rotate at a constant speed corresponding to a demand $W_2$, the element 3a rotates in the direction of its arrow, and the cam 11 starts to rotate at half the speed of element 3a in the same direction as the latter. However, as the cam 11 rotates, the ball 10 is moved away from the center of timing disc 7, and the element 3b commences to rotate in the direction of its arrow. The speed of cam 11 gradually falls as the speed of element 3b rises, until a condition of equilibrium is reached at which the speed of element 3b exactly equals the speed of element 3a, and the cam 11 is stationary.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a demand meter, a primary meter element operable at variable speed, a timing element operable at substantially constant speed, and variable-ratio transmission and differential mechanism connecting said elements, said mechanism including a pair of rotary members having adjacent non-engaging surfaces, a ball in engagement with said surfaces for transmitting the motion of one to the other, at least one of said surfaces having a variable radius along a path of movement of said ball, and differential means for moving said ball along said path.

2. In a demand meter, a primary meter element operable at variable speed, a timing element operable at substantially constant speed, and variable-ratio transmission and differential mechanism connecting said elements, said mechanism including a pair of rotary members each having a surface of a geometrical form traced by the revolution of a straight line, said rotary members being so positioned that a linear element of one surface is substantially parallel to a linear element of the other surface, at least one of said elements having a variable radius along the corresponding linear element, a rolling contact element in engagement with said surfaces, and means for moving said contact element in a direction parallel to said linear elements.

3. In a demand meter, a primary meter element operable at variable speed, a timing element operable at substantially constant-speed, and variable-ratio transmission and differential mechanism connecting said elements, said mechanism including a pair of rotary members each having a surface of a geometrical form traced by the revolution of a straight line, said rotary members being so positioned that a linear element of one surface is substantially parallel to a linear element of the other surface, at least one of said surfaces having a variable radius along the corresponding linear element, a ball in engagement with said surfaces and differential means for moving said ball in a direction parallel to said linear elements.

4. In a demand meter, a primary meter element operable at variable speed, a timing element operable at substantially constant speed, and variable-ratio transmission and differential mechanism connecting said elements, said mechanism including a cylinder and a disc mounted for rotation in such positions that a linear element of the cylinder is substantially parallel to a radius of the disc, a ball in engagement with the cylinder and the disc, and differential means for moving the ball substantially parallel to said linear element of the cylinder.

5. In a demand meter, a primary meter element operable at variable speed, a timing element operable at substantially constant speed, variable ratio transmission mechanism comprising a pair of rotary members having adjacent non-engaging surfaces, a ball in engagement with said surfaces for transmitting the motion of one of said surfaces to the other, at least one of said surfaces having a variable radius along a path of movement of said ball, differential mechanism comprising a pair of rotary members and differential means for moving said ball along said path, means mechanically connecting one rotary member of said transmission mechanism to one rotary element of said differential mechanism, and means mechanically connecting said meter element and said timing element to the remaining rotary member of said transmission mechanism and said differential mechanism.

BENJAMIN H. SMITH.